United States Patent [19]

Simmons

[11] Patent Number: 5,697,292
[45] Date of Patent: Dec. 16, 1997

[54] NUT-CRACKING APPARATUS

[76] Inventor: Clarence T. Simmons, Rte. 7, Box 419, Dunn, N.C. 28334

[21] Appl. No.: 566,948

[22] Filed: Dec. 4, 1995

[51] Int. Cl.$^6$ ............................................. A23N 5/00
[52] U.S. Cl. ........................... 99/574; 99/575; 99/621
[58] Field of Search .................. 99/568–575, 579–581, 99/617–621, 609–611; 426/481–483

[56] References Cited

U.S. PATENT DOCUMENTS

| | | | |
|---|---|---|---|
| 853,066 | 5/1907 | Crellin | 99/575 X |
| 998,481 | 7/1911 | Elder | 99/574 X |
| 1,455,449 | 5/1923 | Riddle | 99/575 |
| 1,808,744 | 6/1931 | Baudino | 99/575 |
| 2,144,841 | 1/1939 | Glaser | 99/574 |
| 2,230,790 | 2/1941 | Anderson | 99/574 |
| 2,316,025 | 4/1943 | Smith | 99/574 X |
| 4,034,665 | 7/1977 | McFarland et al. | 99/579 X |
| 4,389,927 | 6/1983 | Crompton | 99/575 |
| 4,608,007 | 8/1986 | Wood | 99/575 X |
| 4,708,056 | 11/1987 | Dinanath | 423/482 X |
| 5,303,470 | 4/1994 | Wakelam | 99/574 X |
| 5,361,689 | 11/1994 | Lima et al. | 426/483 X |

*Primary Examiner*—Timothy F. Simone
*Attorney, Agent, or Firm*—Rhodes, Coats & Bennett, L.L.P.

[57] ABSTRACT

A nutcracker that cracks nuts such as pecans with a pair of spaced-apart counter-rotating rollers having a gap therebetween. Nuts are fed through the gap between the rollers and cracked as they are compressed between the rollers. The outer surfaces of the two rollers rotate at different speeds, which causes the nuts to rotate as they pass through the gap. This speed differential of the rollers and resulting rotation of the nuts causes the cracks in the nuts' shells to spread around substantially the entirety of the shell. The nuts are then much more easily opened than nuts cracked using previously designed nut-cracking apparatuses.

7 Claims, 5 Drawing Sheets

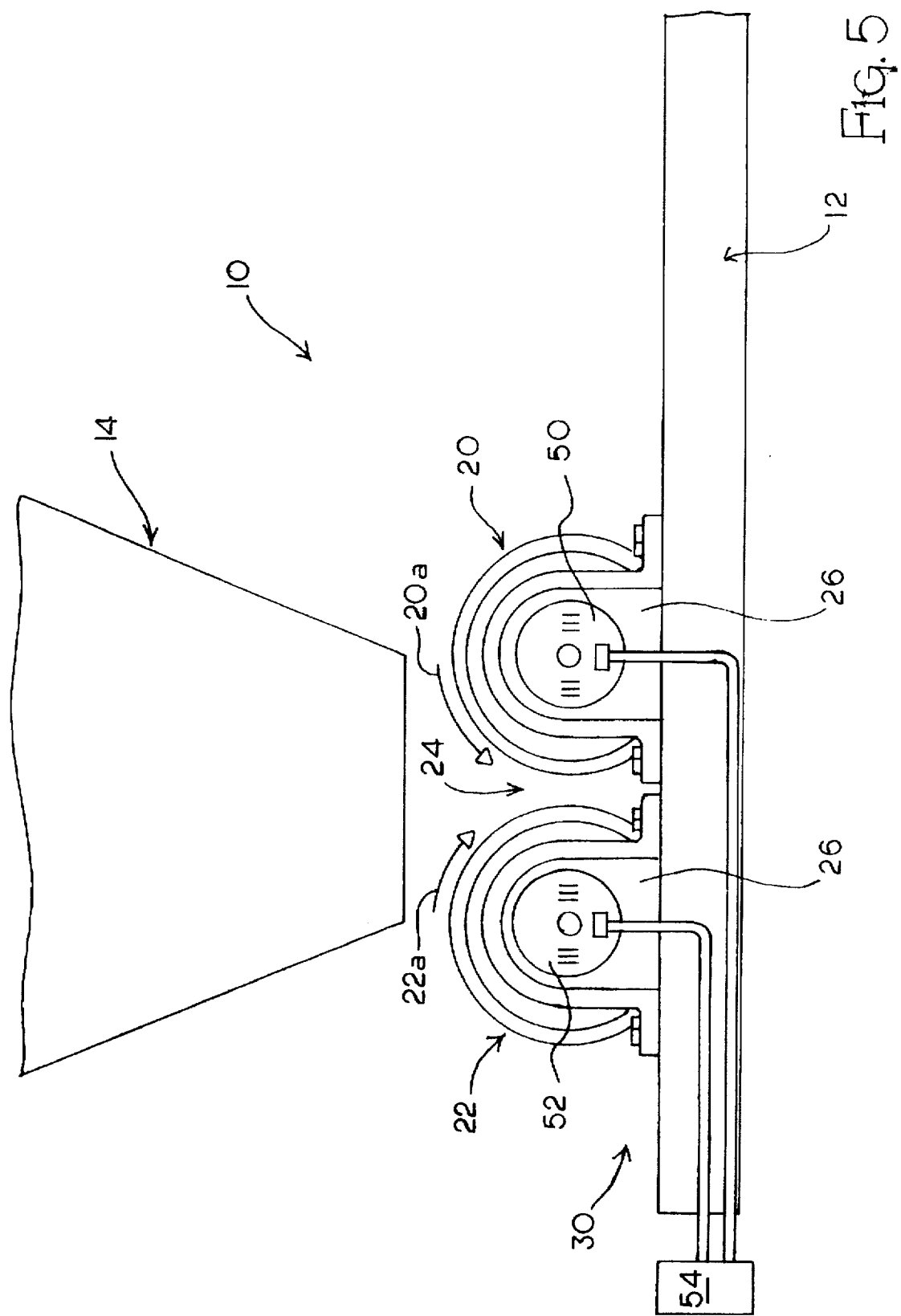

NUT-CRACKING APPARATUS

FIELD OF THE INVENTION

The present invention relates generally to nutcrackers and more particularly to nutcrackers having a pair of counter-rotating rollers for cracking nuts therebetween.

BACKGROUND OF THE INVENTION

In commercial nut processing operations, such as pecan processing plants, it is generally desirable to remove and separate the nutmeat from the shell in whole-halves. After cracking the shell, the shell is separated from the nutmeat using vibration and/or air extraction methods well known to those skilled in the art. To successfully separate the shells from the nutmeat, it is essential that the shells be cracked sufficiently to open the nut without damaging or breaking the nutmeat.

Nut-cracking apparatuses commonly used in commercial nut processing plants employ a ram to impact the nut and compress it lengthwise to fracture the shell. This type of apparatus requires that the nut be positioned between the ram and a stationary cracking surface. After the whole nut is inserted between the ram and the cracking surface, the ram is actuated to impact the nut. The ram is then pulled back so that the cracked nut can be removed. These operations require time and, as a result, ram-type nut-cracking machines are relatively slow. Furthermore, ram-type machines tend to be relatively complicated with numerous parts. Consequently, such machines tend to be relatively expensive.

Nut-cracking machines that use a pair of counter-rotating roller to crack or crush nuts as the nuts pass between the rollers are also well known. For example, the following United States patents all disclose nut-cracking devices that include counter-rotating rollers: U.S. Pat. No. 853,066 to Crellin; U.S. Pat. No. 1,455,449 to Riddle; U.S. Pat. No. 1,808,744 to Baudino; U.S. Pat. No. 2,144,841 to Glaser; U.S. Pat. No. 2,230,790 to Anderson; U.S Pat. No. 998,481 to Elder; U.S. Pat. No. 5,303,470 to Wakelam; and U.S. Pat. No. 4,389,927 to Crompton. These prior art devices tend to only contact small areas of the outer surfaces of the nuts as the nuts are compressed between the rollers. The localized compression results in relatively short cracks making it difficult to separate the nutmeat from the shell. Accordingly, there remains a need for a new and improved nutcracker that can more effectively crack the shell of the nut.

OBJECTS AND SUMMARY OF THE INVENTION

In view of the above, an object of the present invention is to provide a nutcracker that spreads the cracks around substantially the entire shell of the nuts so that the shell is easily opened.

Another object of the invention is to provide a nut-cracking apparatus that can crack large quantities of nuts in a relatively short period of time.

Another object of the present invention is to provide a nutcracker that rotates the nuts as they are cracked.

A further object of the present invention is to provide a nutcracker that can be adjusted to crack various sizes of nuts.

It is a particular object of the present invention to provide a nutcracker that simultaneously compresses and rotates the nuts between two rollers as they are cracked, thereby spreading the cracks around substantially the entire shell of the nuts.

The present invention achieves these and other objects by providing a nutcracker that includes a pair of spaced-apart rollers having a gap therebetween which is slightly narrower than the diameter of the nuts to be cracked. Nuts, such as pecans, are fed through the gap between the rollers and cracked as they are compressed between the rollers. Each roller has an outer gripping surface to engage the nuts and help feed the nuts into the gap. The outer surfaces of the two rollers rotate at different speeds, thereby rotating the nuts as they pass through the gap. This speed differential and resulting rotation of the nuts spreads the cracks around substantially the entirety of the shell. The nuts are then much more easily opened.

In the preferred embodiment of the invention, the apparatus includes two counter-rotating rollers of approximately the same diameter. The rollers are rotated by a drive system so as to feed the nuts into the gap. However, one of the rollers is rotated at a greater angular velocity than the other roller. Alternately, two rollers of different diameters could be provided and rotated at the same angular velocity. The outer surface of the roller with the greater diameter would therefore move at a greater speed than the outer surface of the smaller roller. With either configuration, the difference between the outer surface speeds of the two rollers can be varied depending on the type of nuts being cracked.

In another embodiment of the invention, only one roller is driven by the drive system and the other roller acts as a non-driven idler roller. The idler roller will inevitably rotate somewhat as nuts are forced through the gap; however, the idler roller is relatively stationary compared to the driven roller. The idler roller thus acts as an anvil against which nuts are compressed and rotated by the driven roller. This configuration provides great outer surface speed differentiation between the rotating driven roller and the stationary idler roller to impart a great degree of rotation of the nut.

In still another embodiment of the invention, the rollers are both rotated by the drive system in the same direction instead of being counter-rotated. In this embodiment, the roller rotating towards the gap rotates with a greater outer surface speed than the roller rotating away from the gap. Therefore, even though one roller is rotating away from the gap, the greater outer surface speed of the roller rotating towards the gap ensures that the nuts will eventually be fed through the gap and cracked. The especially great outer surface speed differentiation between the two rollers in this embodiment imparts the greatest degree of rotation of the nuts as they pass through the gap.

In all embodiments of the invention, the drive system preferably comprises a motor/gearbox linked to one or both rollers by a drive gear, a drive chain, and a sprocket on one end of each driven roller. In an embodiment using two equally sized rollers, the sprockets would be differently sized to impart different angular velocities to the rollers. In an embodiment using differently sized rollers, the sprockets would preferably be the same size. Alternately, in any of the above-described embodiments, each roller could include its own variable speed, reversible DC drive motor.

Other aspects of the present invention will become apparent and obvious from a study of the following description and the accompanying drawings, which are merely illustrative of the invention.

BRIEF DESCRIPTION OF THE DRAWINGS

FIG. 5 is a side view of a second alternate embodiment of the invention that has a separate drive motor for each roller.

DETAILED DESCRIPTION OF THE INVENTION

Figure 1:
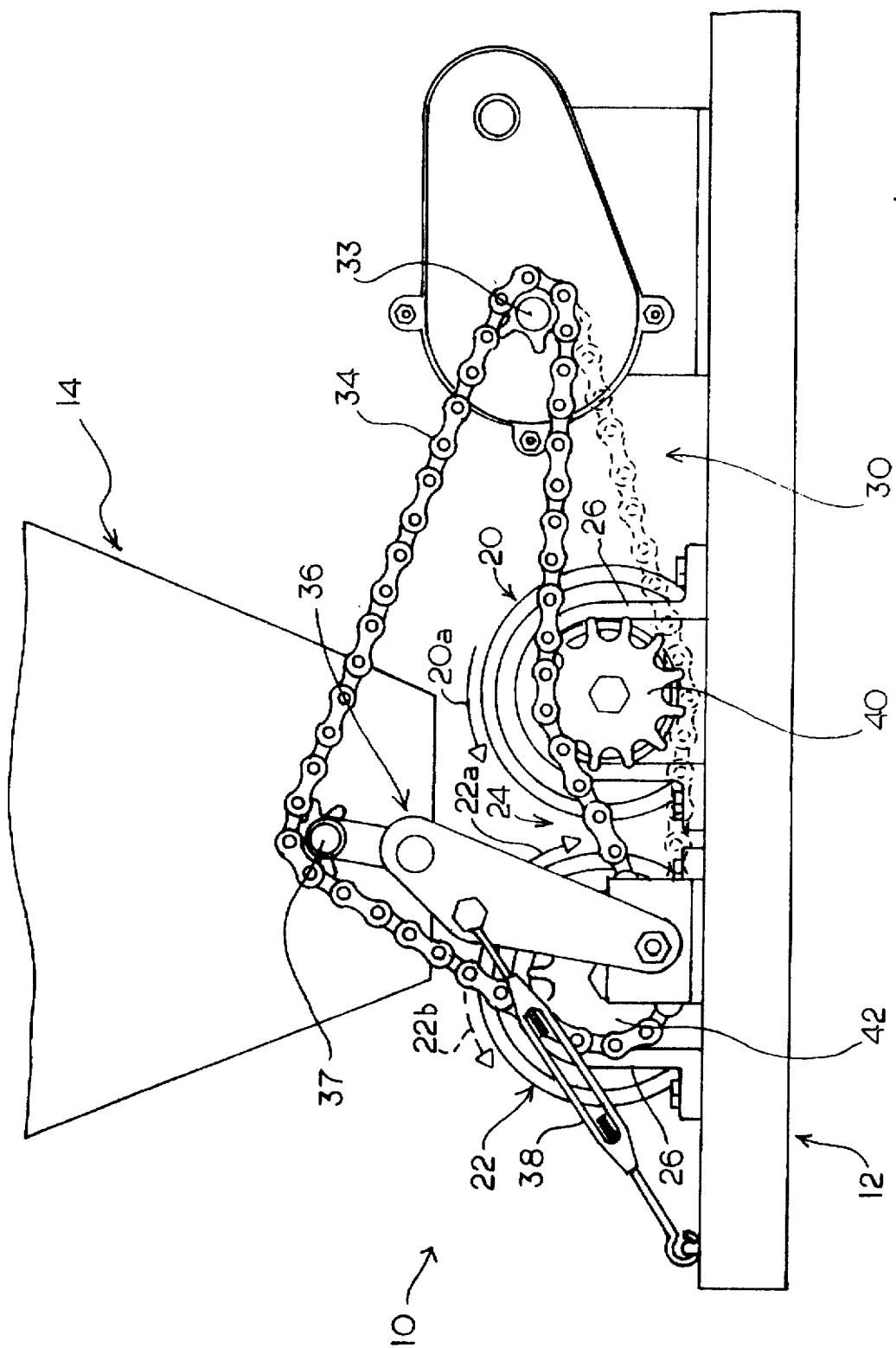
FIG. 1 is a side view of one embodiment of the nutcracker of the invention having two counter-rotating rollers that rotate at different speeds.

The present invention is described more fully hereinafter by referring to the drawings, in which a preferred embodiment and several alternate embodiments are depicted. However, the present invention can take on many different embodiments and is not intended to be limited to the embodiments described herein.

Figure 2:
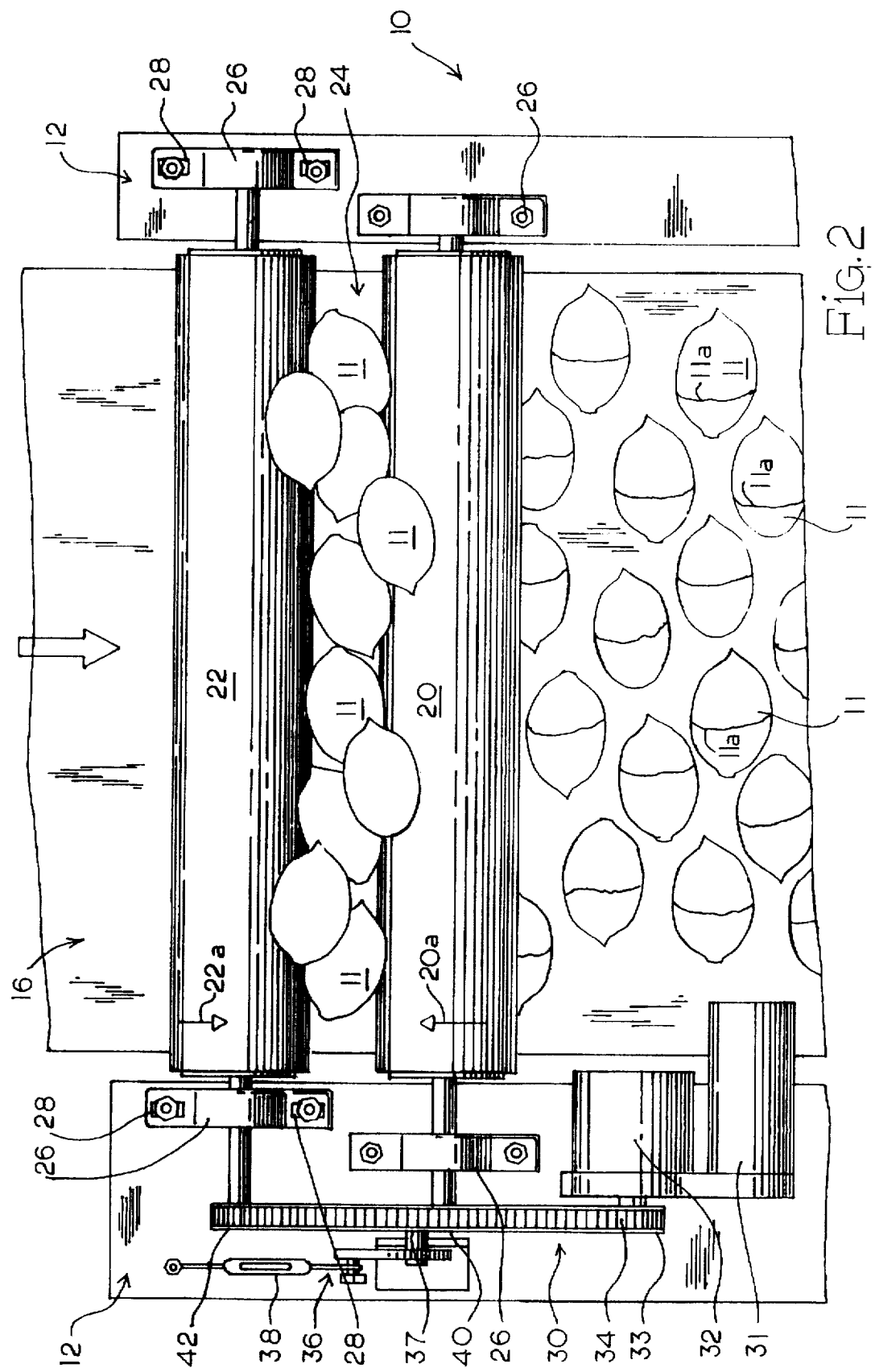
FIG. 2 is a top view of the embodiment of the nutcracker shown in FIG. 1 being used to crack nuts such as pecans.

Referring now to the drawings in general and FIGS. 1 and 2 in particular, a nutcracker, generally designated 10, is shown constructed according to the present invention for cracking the shells of nuts 11 such as pecans. The nutcracker 10 includes a first roller 20 and a second roller 22, which compress, rotate, and crack nuts 11 fed through a gap 24 between the rollers. A roller drive system 30 rotates one or both of the rollers 20, 22. A preferred embodiment of the nutcracker 10, such as that used in a commercial or industrial setting, also includes a base structure 12 upon which the rollers 20, 22 and roller drive system 30 are mounted, a feed mechanism such as a bin or hopper 14 for holding a batch of nuts 11 to be cracked, and a conveyor 16 for transporting cracked nuts 11 away from beneath the rollers 20, 22.

In the embodiments shown in all of the drawings, both rollers 20, 22 are identically configured and have the same diameter. For example, both rollers 20, 22 could be cylinders approximately 3.5 inches wide and 12 inches long. As will be explained below, however, one roller can have a larger diameter than the other. The outer surfaces of the rollers 20, 22 are preferably covered with a gripping material such as a 50-grit non-slip resin-bonded abrasive material forming a gripping layer 25. See FIG. 3. Alternately, the rollers 20, 22 could have knurled or stippled outer surfaces to effectively grip the nuts.

A key aspect of the nutcracker 10 of the invention is that the outer surface of one roller rotates towards the gap 24 at a greater velocity than the outer surface of the other roller. The different speeds of the outer surfaces of the rollers 20, 22 causes the nuts 11 to rotate as they pass through the gap 24. This rotation, which occurs simultaneously with the compression of the nuts by the rollers 20, 22, causes the cracks in the nuts' shells to spread around substantially the entirety of the shell instead of being localized in only a small area of the shell. The nuts 11 are then much more easily opened than nuts cracked using previously designed nut-cracking apparatuses.

To provide outer surface speed differentiation to the rollers 20, 22, two different concepts may be employed. In the preferred embodiment, equal-sized rollers are rotated with different angular velocities. As used herein, "angular velocity" is defined as a given change in angle (not distance) of travel in a given unit of time, whereas "outer surface speed" is defined as the actual distance of travel of a point on the outer surface of a roller in a given unit of time. It should be understood that with rollers of equal diameter, different angular velocities result in different outer surface speeds. In an alternate configuration, rollers of unequal diameters are rotated at the same angular velocity. Identical angular velocities with rollers of unequal diameter also result in different outer surface speeds. The present invention is not limited to any particular outer surface speed differentiation between the rollers or any particular angular velocity.

Figure 3:
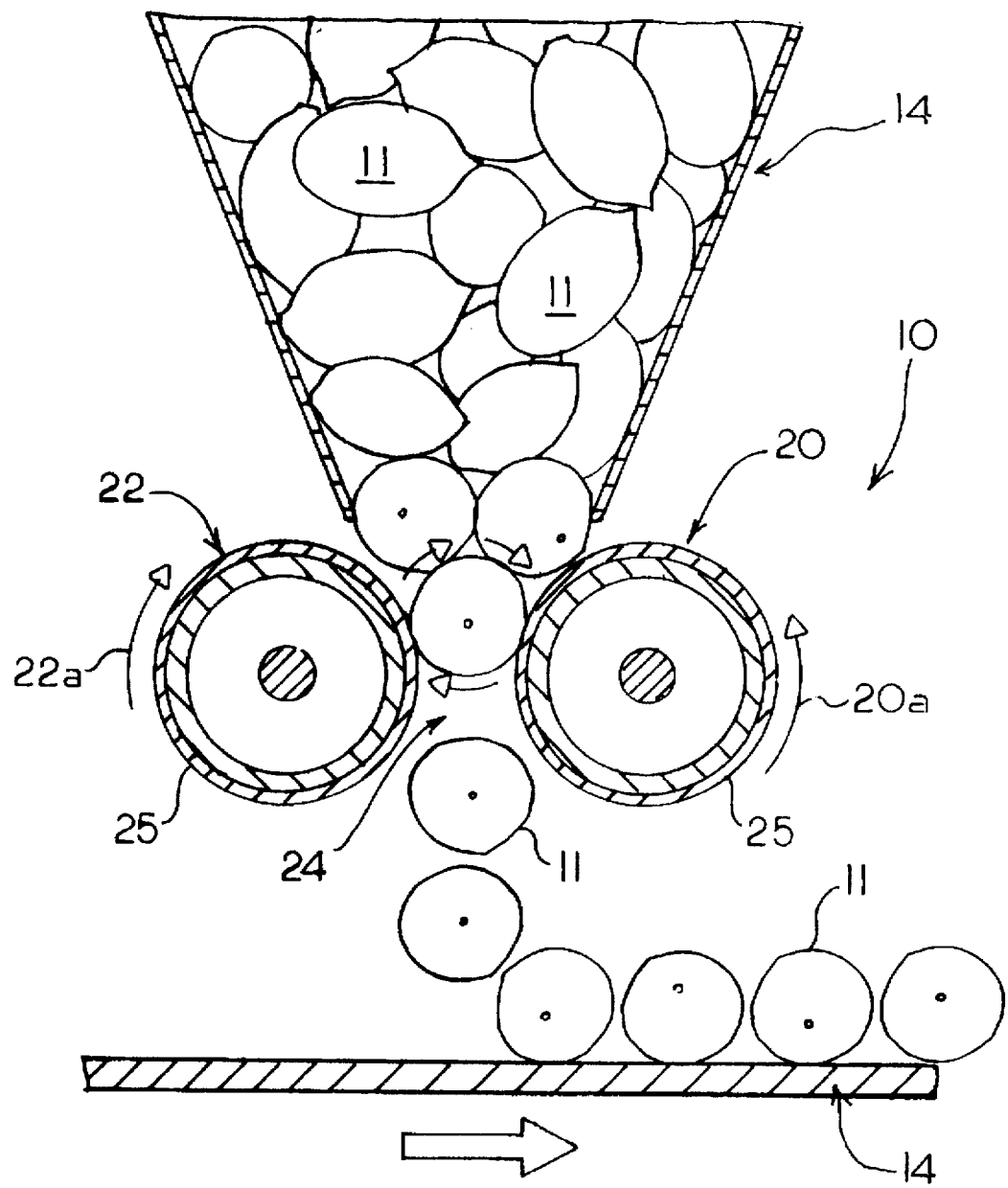
FIG. 3 is a schematic side view of the nutcracker of the invention cracking nuts, which shows the path that nuts take through the nutcracker.

FIG. 3 shows the path of nuts 11 as they travel from the hopper 14, through the gap 24 between the rollers 20, 22, and onto the conveyor 16. It can be seen from this drawing that as the nuts 11 enter the gap 24, the nuts 11 align themselves so that the longitudinal axes of the nuts 11 are parallel with the axes of the rollers 20, 22. As the nuts 11 are forced through the gap 24 and are compressed by the rollers 20, 22, the nuts 11 rotate on their longitudinal axes because of the speed differentiation between the rollers. This gives rise to equatorial cracks 11a that extend substantially all the way around the shells of the nuts 11.

In all of the depicted embodiments, both rollers 20, 22 are rotatably mounted in pillow blocks 26 that are attached to the base structure 12. One or both of the rollers 20, 22 are adjustable so that the width of the gap 24 can be varied depending on the size of nut to be cracked. It should be understood that for proper cracking of nuts 11, the gap 24 should be slightly narrower than the diameter of the nuts 11. In the embodiments shown, the pillow blocks 26 that support each end of the roller 22 include adjustment slots 28. To adjust the roller 22, the bolts securing the pillow block 26 and the pillow block 26 is repositioned. The bolt is then retightened when the desired spacing is attained. Although only roller 22 is depicted as being adjustable, it is conceivable that roller 20 could also be adjustable in the same or similar manner.

In the embodiment depicted in FIGS. 1 and 2, the roller drive system 30 preferably includes a motor 31, gearbox 32, drive gear 33, an endless drive belt or chain 34, a first roller gear 40, second roller gear 42, and a tensioner apparatus 36 having a tensioner gear 37. The motor 31 may be any conventional electric or fuel-burning motor that can be set to turn at a preselected rate. Preferably, the motor 31 comprises a one-third horsepower reversible electric motor. Preferably, a chain drive 34 is used for durability and maximum performance; however, a flexible belt could be substituted for chain 34 if desired. If a chain 34 is used, the first and second roller gears 40, 42 comprise toothed sprocket gears that engage the chain 34. As can be seen from FIG. 1, the chain 34 is preferably routed around the sprocket gears 40, 42 in such a way that the rollers 20, 22 counter-rotate, i.e., over sprocket gear 40 and under sprocket gear 42. Thus, the outer surfaces of the rollers 20, 22 converge inwardly towards the gap 24 from above when the chain 34 is driven clockwise. The tensioner apparatus 36 pulls the chain tight to ensure that the chain 34 does not slip off of the drive gear 33 or sprocket gears 40, 42. To allow the tension of the chain 34 to be adjusted after, for example, the width of the gap 24 is adjusted, the tensioner apparatus 36 includes an adjustment device such as turnbuckle 38. Alternately, a tension spring could be substituted for the turnbuckle 38.

The rollers 20, 22 in the embodiment shown in FIGS. 1 and 2 are rotated with different angular velocities, and accordingly different outer surface speeds, by using roller gears 40 and 42 of different sizes. For exemplary purposes only, the first roller 20 is designated as the faster of the two rollers. This is illustrated in the drawings by rotation vector arrow 20a of roller 20 being longer than rotation vector arrow 22a of roller 22. Thus, roller gear 40 is smaller than roller gear 42. With belt driven rollers (not shown), roller 20 would have a smaller diameter belt pulley (not shown) than that of roller 22. The ratio of outer surface speed differentiation between the two rollers 20, 22 can be varied by changing the sizes of the respective roller gears 40, 42. Generally speaking, the greater the outer surface speed differentiation, the greater the amount of rotation of the nuts 11 as they pass between the rollers and the greater the amount of time that the nuts are compressed between the rollers. Greater outer surface speed differentiation is therefore useful for especially strong nuts that require more effort to crack.

As alluded to above, the rollers 20, 22 could be made with unequal diameters in another embodiment of the invention (not shown) in order to impart different outer surface speeds to the rollers. In this case, both rollers could be rotated at the same angular velocity yet still rotate nuts passing through the gap between the rollers. For example, first roller 20 could be made with a greater diameter than second roller 22. For even greater outer surface speed differentiation, the larger roller could also be rotated at a greater angular velocity than the smaller roller.

Figure 4:
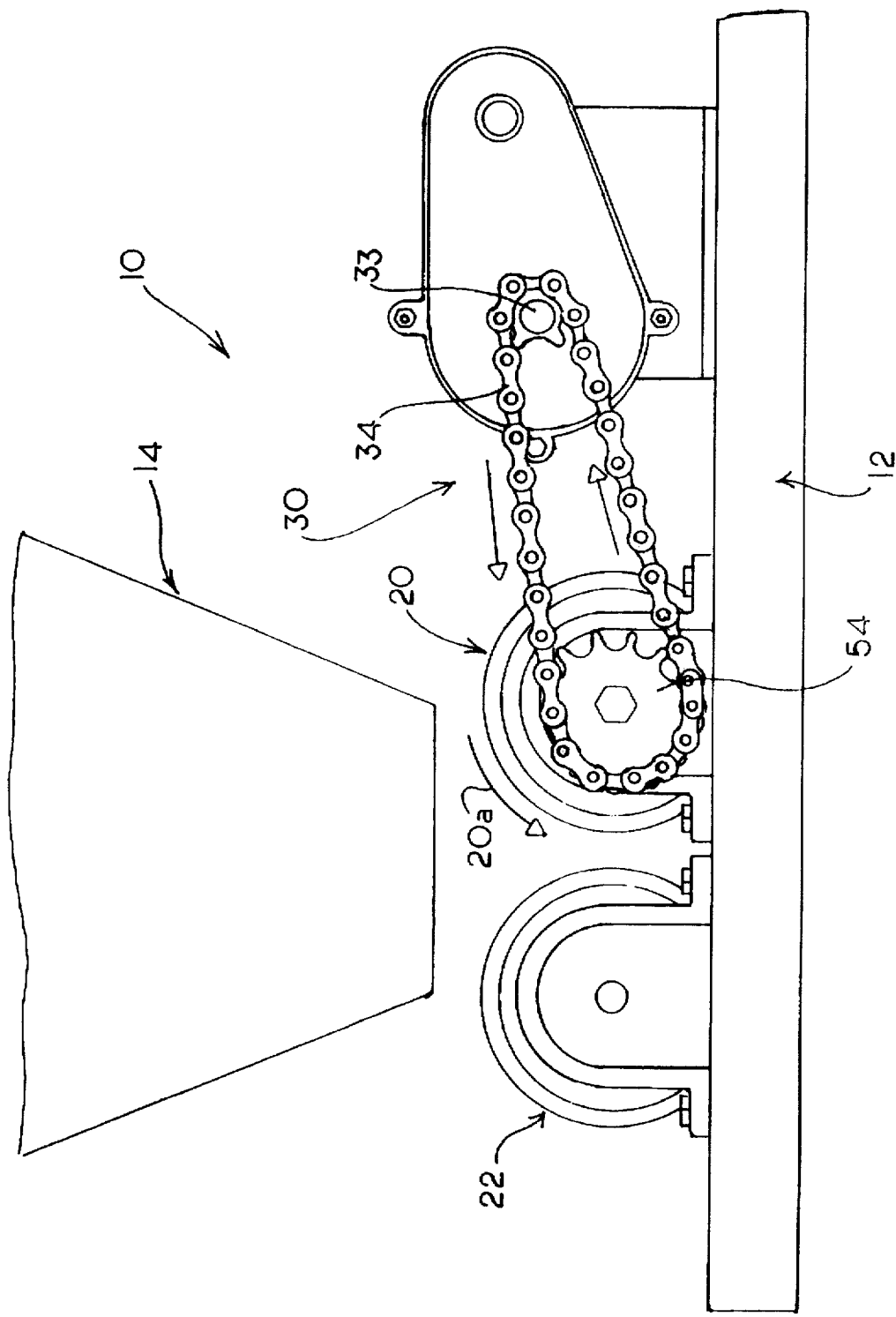
FIG. 4 is a side view of an alternate embodiment of the invention that has only one driven roller and one idler roller.

FIG. 4 depicts an alternate embodiment of the invention, wherein the second roller 22 acts as an undriven idler roller and only the first roller 20 is driven by the drive system 30. The idler roller 22 will inevitably rotate somewhat as nuts 11 are forced through the gap 24; however, the idler roller 22 is relatively stationary compared to the driven roller 20. This is depicted in FIG. 4 by the inclusion of rotation vector arrow 20a adjacent driven roller 20 but no corresponding rotation vector arrow adjacent idler roller 22. The idler roller 22 thus acts as a freely rotating anvil against which nuts 11 are compressed and rotated by the driven roller 20. In this embodiment, the idler roller could be replaced by a stationary anvil plate. The embodiment of the nutcracker 10 shown in FIG. 4 provides greater outer surface speed differentiation between the rotating driven roller 20 and the stationary idler roller 22 to ensure that the nuts 11 will be cracked around their entireties.

Referring back to FIG. 1, another embodiment of the nutcracker 10 of the invention may be appreciated by considering the alternate route of the chain 34, shown in dotted lines, which runs beneath the roller gear 40 of the first roller 20. In this embodiment, both rollers 20, 22 are rotated by the drive system 30 in the same direction instead of being counter-rotated. This is illustrated by rotation vector arrow 22b (dotted lines) adjacent roller 22. It should also be appreciated that the first roller 20, which rotates towards the gap 24, rotates with a greater outer surface speed than the second roller 22, which rotates away from the gap 24. Therefore, even though roller 22 is rotating away from the gap while roller 20 is rotating towards the gap, the greater outer surface speed of roller 20 ensures that the nuts will eventually be forced through the gap 24 and cracked. Thus, roller 20 rotates at a positive velocity relative to the gap 24, whereas roller 24 rotates at a negative velocity relative to the gap 24. This results in a much grater speed differentiation between the two rollers 20 and 22.

FIG. 5 depicts still another embodiment of the invention, whereby each roller 20, 22 is separately driven by its own motor. Like the embodiments shown in FIGS. 1-4, the embodiment shown in FIG. 5 preferably uses rollers 20, 22 having the same diameter, although different sized rollers could be utilized here as well. In this embodiment, the roller drive system 30 comprises a pair of variable speed, reversible DC drive motors 50, 52. Drive motor 50 rotates roller 20 and drive motor 52 rotates roller 22. Both drive motors 50, 52 are controlled by, for example, a computerized controller 54, which can be programmed to rotate the rollers 20, 22 in either direction at any speed. Thus, the nutcracker 10 shown in FIG. 5 can be programmed to operate in a variety of modes to crack a variety of different types of nuts.

Because of the versatility of the roller drive system 30 shown in FIG. 5, this embodiment can function in the same way as any of the previously described embodiments shown in FIGS. 1-4. For example, the first roller 20 can be counter-rotated faster than the second roller 22 to operate in the manner of the embodiment shown in FIGS. 1 and 2. In addition, the second roller 22 can be turned by drive motor 52 in the same direction as the first roller 20 but slower than the first roller 20 to operate in the manner of the alternate embodiment shown in dotted lines in FIG. 1. In still another operational mode, the first roller 20 can be rotated by drive motor 50 while drive motor 52 remains idle to permit roller 22 to function as an idler roller in the manner of the embodiment shown in FIG. 4. Although FIG. 5 depicts both rollers 20, 22 as having approximately the same diameter, this embodiment could also utilize different sized rollers as described above.

The drive system 30 of all the above embodiments preferably can be operated in reverse. Reverse operation is useful if the gap 24 between the rollers becomes clogged with nuts 11. In fact, it is preferable in a computer controlled nutcracker 10, such as that described above in reference to FIG. 5, that the computer controller 54 be programmed so that the rollers 20, 22 are intermittently reversed during an operational mode for short periods of time to periodically dislodge nuts that become stuck between the rollers.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An apparatus for cracking nuts comprising:
   a) a pair of spaced apart rollers having a gap therebetween for nuts to enter, each roller having an outer cracking surface for engaging the nut from opposite sides; said gap between rollers being slightly smaller than the diameter of said nuts;
   b) a roller drive for rotating said rollers at differential surface speeds, wherein said rollers rotate in the same direction with the higher surface speed roller forcing the nut through the gap between said rollers during which the nuts are compressed between the rollers and their shells are cracked; said differential surface speeds between said rollers causing rotation of said nuts as they pass between said rollers to propagate the cracks around a substantial portion of the shells.

2. The nut-cracking apparatus of claim 1 wherein said roller drive includes a single drive motor for driving said rollers.

3. The nut-cracking apparatus of claim 1 wherein said roller drive includes an independent drive motor for driving each of said rollers.

4. The nut-cracking apparatus of claim 1 further including adjustment means for adjusting the spacing between the rollers to accommodate nuts of different sizes.

5. An apparatus for cracking nuts comprising:
   a) a first roller;
   b) a second roller spaced a predetermined distance from the first roller so as to define a gap therebetween slightly smaller than the diameter of the nut to be cracked;

c) a feed mechanism for feeding nuts into the gap between the rollers;

d) a roller drive for rotating said rollers at differential surface speeds, wherein said rollers rotate in the same direction, forcing the nuts through the gap between said rollers during which the nuts are compressed between the rollers and their shells are cracked;

e) wherein the first roller has a greater outer surface speed than the second roller, causing rotation of said nuts as they pass between said first and second rollers while feeding said nuts through the gap.

6. The nut-cracking apparatus of claim 5 wherein said roller drive includes a single drive motor for driving said rollers.

7. The nut-cracking apparatus of claim 5 wherein said roller drive includes an independent drive motor for driving each of said rollers.

* * * * *